United States Patent
Otsuka et al.

(10) Patent No.: US 7,142,785 B2
(45) Date of Patent: *Nov. 28, 2006

(54) LIGHT BRANCHING/INSERTING APPARATUS AND LIGHT BRANCHING APPARATUS USING WAVELENGTH SELECTION FILTER

(75) Inventors: Kazue Otsuka, Kawasaki (JP); Hiroshi Onaka, Kawasaki (JP); Terumi Chikama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/354,077

(22) Filed: Jan. 30, 2003

(65) Prior Publication Data

US 2003/0138254 A1    Jul. 24, 2003

Related U.S. Application Data

(62) Division of application No. 09/076,068, filed on May 12, 1998, now Pat. No. 6,538,782.

(30) Foreign Application Priority Data

Feb. 2, 1998  (JP) .................................... 10-20615

(51) Int. Cl.
H04B 10/00   (2006.01)
(52) U.S. Cl. .......................................... 398/85; 398/83
(58) Field of Classification Search ............... 359/308; 398/83–88, 25, 33, 34
See application file for complete search history.

(56) References Cited

U.S. PATENT DOCUMENTS 5,276,543 A * 1/1994 Olshansky .................. 398/79
5,396,359 A * 3/1995 Abramovitz ................. 398/51
5,576,875 A   11/1996 Chawki et al. ............. 359/125
5,600,466 A    2/1997 Tsushima et al. ........... 359/124

(Continued)

FOREIGN PATENT DOCUMENTS

JP    4-167634    6/1992

(Continued)

OTHER PUBLICATIONS

English language Abstract of Japanese Patent Publication No. 03-053226, published Mar. 7, 1991.

(Continued)

Primary Examiner—Agustin Bello
(74) Attorney, Agent, or Firm—Staas & Halsey LLP (57) ABSTRACT

A light branching/inserting apparatus which can easily control light signal wavelengths, and which can branch, insert or transmit light signals having an optional wavelength and optional multiplexed number, by using a wavelength selection filter utilizing acousto-optic effects. The apparatus comprises; an ADM node section 10 which has an AOTF 11 with four ports as a wavelength selection filter and is connected to a transmission path, an RF signal generator 20 which generates an RF signal of an optional frequency and applies the signal to the AOTF 11, a selected wavelength-variable light branching section 30 which receives and processes the light signal output from the branching port of the AOTF 11 for each wavelength, a light inserting section 40 which generates an optional number of insertion light signals with optional wavelengths and sends the insertion light signals to an insertion port of the AOTF 11, and a monitoring section 50 which monitors the spectrum of the light signal input/output to/from the ADM node section 10.

16 Claims, 7 Drawing Sheets

U.S. PATENT DOCUMENTS

| | | | | |
|---|---|---|---|---|
| 5,680,235 | A | * | 10/1997 | Johansson ...................... 398/7 |
| 5,701,195 | A | * | 12/1997 | Chikama ............... 359/341.43 |
| 5,717,795 | A | | 2/1998 | Sharma et al. ................ 385/24 |
| 5,943,151 | A | | 8/1999 | Grasso et al. ............... 359/161 |
| 6,069,719 | A | | 5/2000 | Mizrahi ...................... 359/124 |
| 6,134,036 | A | | 10/2000 | Andreozzi et al. .......... 359/127 |
| 6,411,411 | B1 | * | 6/2002 | Okazaki et al. ............. 398/207 |
| 6,538,782 | B1 | * | 3/2003 | Otsuka et al. ................ 398/82 |

FOREIGN PATENT DOCUMENTS

| | | |
|---|---|---|
| JP | 9-113855 | 5/1997 |
| WO | WO 97/10658 | 3/1997 |

OTHER PUBLICATIONS

English language Abstract of Japanese Patent Publication No. 08-018538, published Jan. 19, 1996.

English language Abstract of Japanese Patent Publication No. 09-243978, published Sep. 19, 1997.

English language Abstract of Japanese Patent Publication No. 07-212347, published Aug. 11, 1995.

* cited by examiner

LIGHT BRANCHING/INSERTING APPARATUS AND LIGHT BRANCHING APPARATUS USING WAVELENGTH SELECTION FILTER

This application is a divisional of application Ser. No. 09/076,068, filed May 12, 1998, now U.S. Pat. No. 6,538,782.

TECHNICAL FIELD

The present invention relates to a light branching/inserting apparatus and a light branching apparatus in an optical network using a wavelength division multiplexing (hereinafter referred to as WDM) method. In particular, the present invention relates to a light branching/inserting apparatus and a light branching apparatus which use a wavelength selection filter utilizing acousto-optic effects, as a filter performing light branching and insertion.

BACKGROUND ART

The WDM method utilizing a band characteristic of an optical fiber, is a method anticipated for enlarging the transmission capacity and constructing an optical network which is flexible in the input/output of signals. Compared to the conventional method in which light having one kind of wavelength is modulated and transmitted to one fiber at a high speed, if wavelength division multiplexing is performed using this method with the same transmission speed, the information can be increased by the number of wavelength division multiplexing and transmitted. Furthermore even if the signal is transmitted at a low speed, by wavelength division multiplexing, a similar transmission capacity can be obtained as with the conventional method for transmitting a signal of one wavelength at a high speed. With the WDM method, the interval of each wavelength to be multiplexed should be such that the wavelenghts are apart from each other so that each wavelength is not affected by the adjacent wavelength signal. At present, the band of an optical amplifier has been enlarged (to be more than ten nanometers), and a filter on the reception side having a narrow selection zone has been realized. Hence experiments of a WDM transmission system with a wavelength interval of about 1 nm have been reported, and this system is about to be introduced as an actual system.

Furthermore, the recent trend of research is to realize an optical network based on this WDM transmission system. As the optical network, as proposed in for example, Japanese Unexamined Patent Publication No. 4-167634, there can be mentioned a network having an ADM (Add-Drop Multiplexer) function such that not only WDM signals are transmitted from point to a point, but also only a light signal having a certain wavelength among wavelength division multiplexed light signals is selectively transmitted at a junction point referred to as a node provided along the transmission path, and light signals having other wavelengths are received at the node, or another light signal is inserted from the node and transmitted to other nodes. The ADM function has the characteristic in that it can freely branch or insert a signal in the optical state, and is a technique peculiar to the WDM method.

Figure 8:
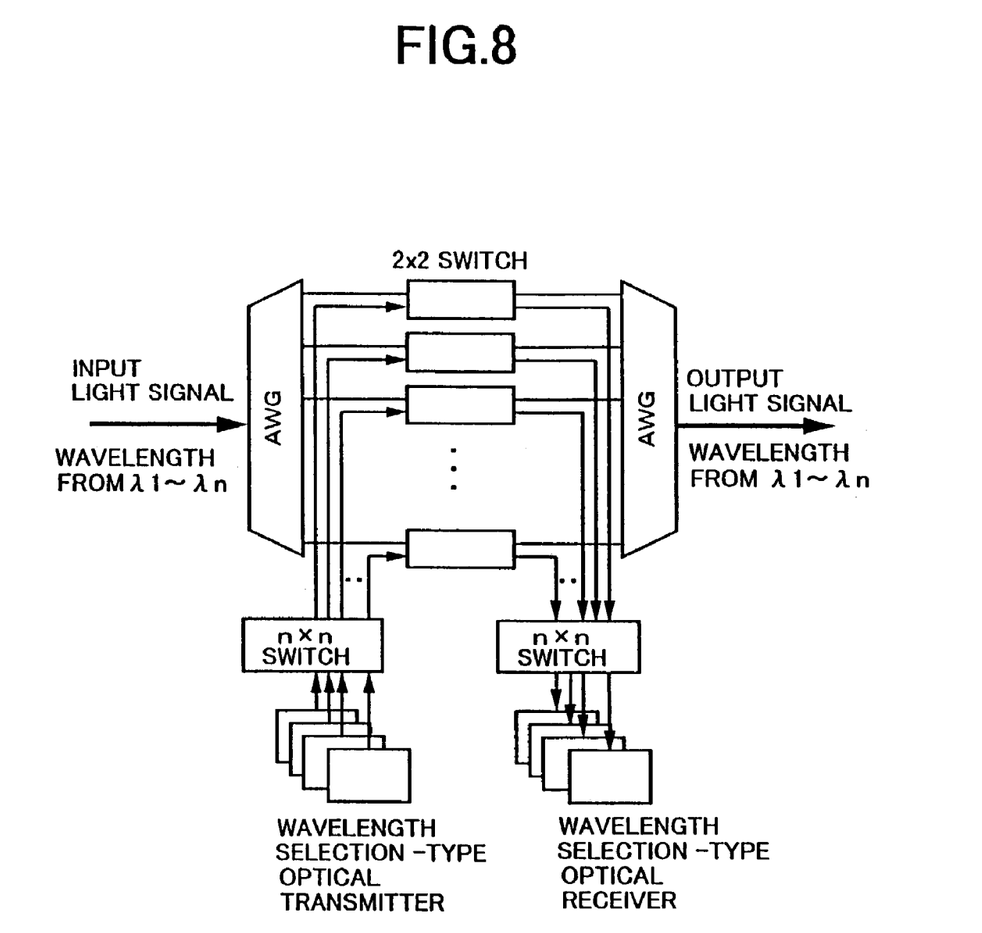
FIG. 8 is a diagram showing a construction of a conventional light branching/inserting apparatus using an AWG.

As the conventional light branching/inserting apparatus (hereinafter referred to as an ADM node apparatus), for example, as shown in FIG. 8, there is an apparatus formed by combining two Arrayed Waveguide Gratings (hereinafter referred to as AWG). The AWG is a device having a light-wave mixing function or a light-wave dividing function, and when a wavelength division multiplexed light signal is input to an input port, a light signal wave-divided for each wavelength is output from each port on the output side. On the contrary, when the AWG inputs light having a previously determined wavelength corresponding to each port, a wavelength division multiplexed light signal in which this light is wave-mixed is output on the output side. The ADM node apparatus formed using the AWG, wave-divides the multiplexed light signal for each wavelength with the AWG on a first stage (on the input side), controls the branching, insertion or transmission, respectively, for each wavelength, and wave-mixes again the light signals of each wavelength with the AWG on a second stage (on the output side) to send them to the transmission path. The control of the branching, insertion or transmission of a light signal having an optional wavelength can be realized, for example, by providing a light switch on each output port in the AWG on the first stage, and controlling the switching state.

With such a conventional ADM node apparatus, the transmission light wavelength characteristics of the AWG are designed in advance corresponding to each wavelength of a multiplexed light signal used for the transmission. Moreover, the input wavelength characteristics and the output wavelength characteristics to/from each port in the AWG are determined not optionally but relatively with periodicity. Therefore, it is important as a function of the ADM node apparatus that each port and the wavelengths of the light signals are always controlled precisely.

With the abovementioned conventional ADM node apparatus, as the number of wavelength division multiplexing increases, the control of the wavelength of light signals for each port becomes complex and the node construction becomes complicated. Moreover, in the designing stage, since the wavelength and the largest number of the wavelengths to be used in the ADM node apparatus are determined beforehand, the ADM node apparatus has a defect in that it is difficult to make this correspond to changes in the wavelengths to be used later, to addition of signals, and so on. Furthermore, the conventional ADM node apparatus has a periodic variation to the wavelength with respect to the transmission characteristics. Hence there is the problem in that with a ring network or the like to be used by connecting ADM nodes in multi stages, measures for correcting the light power for each wavelength and the like become necessary by using, for example, an optical attenuator or the like.

It is effective to use an acousto-optic filter for the ADM filter as one device for facilitating control of the wavelength of a light signal for each port. The ADM node construction using an acousto-optic filter is proposed in, for example, Japanese Unexamined Patent Publication No. 9-113855. The abovementioned technique is to suppress interference noise by shifting a frequency of branched light and insertion light, in order to prevent signal deterioration due to the interference of the branched light and the insertion light which occurs when an acousto-optic filter or the like is used for the ADM node.

With the abovementioned ADM node construction however, since complicated work is necessary for changing the branched/inserted wavelength, and for adding signals and so on, and the insertion light the frequency of which is shifted is wave-mixed with the main light signal at each ADM node and transmitted, then as the number of wavelength division multiplexing in the transmission system increases, the control of the wavelength of the light signal becomes complicated for the whole system.

DISCLOSURE OF THE INVENTION

In view of the above situation, it is an object of the present invention to provide a light branching/inserting apparatus and a light branching apparatus which can control the wavelength of the light signal easily and which can branch, insert or transmit a light signal having an optional wavelength and optional number of division multiplexing by using a wavelength selection filter which utilizes acousto-optic effects.

Therefore, according to one aspect of the present invention, there is provided a light branching/inserting apparatus comprising: a branching/inserting device connected to a transmission path through which wavelength division multiplexed light signals are transmitted, which is capable of branching and inserting light signals having at least one wavelength with respect to light signals on the transmission path; a light branching device for receiving and processing light signals branched by the branching/inserting device for each wavelength; and a light inserting device for outputting insertion light to be inserted into the light signals on the transmission path to the branching/inserting device, wherein the branching/inserting device includes a wavelength selection filter which can generate at least one surface acoustic wave of a frequency corresponding to a selection signal, and which has an input port to which a light signal received from the transmission path is input, an output port from which a light signal to be output to the transmission path is output, a branching port connected to the light branching device and an insertion port connected to the light inserting device, said wavelength selection filter applied with the selection signal and branching a light signal having a wavelength corresponding to the frequency of the surface acoustic wave contained in the light signal which is sent to the input port from the transmission path and outputting the branched light signal to the branching port, as well as inserting an insertion light having a wavelength corresponding to the frequency of the surface acoustic wave and which is sent to the insertion port, into the light signal from the transmission path and outputting the light signal to the output port.

Furthermore, according to another aspect, there is provided a light branching/inserting apparatus connected to a transmission path through which wavelength division multiplexed light signals are transmitted, which is capable of branching and inserting light signals having at least one wavelength with respect to light signals on the transmission path, the apparatus comprising: a light branching device for receiving and processing branched light signals for each wavelength; a light inserting device for generating insertion light to be inserted into the light signals on the transmission path, and a wavelength selection filter which can generate at least one surface acoustic wave of a frequency corresponding to a selection signal, and which has an input port to which a light signal received from the transmission path is input, an output port from which a light signal to be output to the transmission path is output, and a branching port connected to the light branching device and an insertion port connected to the light inserting device, and the wavelength selection filter branches a light signal having a wavelength corresponding to the frequency of the surface acoustic wave contained in the light signal sent to the input port from the transmission path and outputs the branched light signal to the branching port, and also inserts insertion light having a wavelength corresponding to the frequency of the surface acoustic wave and which is sent to the insertion port, into the light signal from the transmission path and outputs the light signal to the output port.

With such a construction, a wavelength division multiplexed light signal on the transmission path is sent to the input port in the wavelength selection filter. Surface acoustic waves of a frequency matched to the wavelength of the light signal to be branched or inserted can be generated in this wavelength selection filter, and only a light signal having a wavelength corresponding to the frequency of a surface acoustic wave among each light wavelength contained in the light signal sent to the input port is subjected to polarization conversion by means of acousto-optic effects and output from the branching port, and light signals having other wavelengths are output from the output port. The light signal output from the branching port is sent to the light branching device to be received and processed for each wavelength. Moreover, insertion light generated by the light inserting device is input to the insertion port of the wavelength selection filter, and the insertion light having a wavelength corresponding to the frequency of the surface acoustic wave is subjected to polarization conversion by means of acousto-optic effects, as in the abovementioned case of branching, inserted into the light signal from the input port, and output from the output port to be sent to the transmission path.

Furthermore, according to another aspect of the present invention, there is provided a light branching apparatus connected to a transmission path through which wavelength division multiplexed light signals are transmitted, which is capable of branching light signals having at least one wavelength from amongst the light signals on the transmission path, the apparatus comprising: a light branching device for receiving and processing branched light signals for each wavelength, and a wavelength selection filter which can generate at least one surface acoustic wave of a frequency corresponding to a selection signal, and which has an input port to which a light signal received from the transmission path is input, an output port from which a light signal to be output to the transmission path is output, and a branching port connected to the light branching device, and the wavelength selection filter branches a light signal having a wavelength corresponding to the frequency of the surface acoustic wave contained in the light signal sent to the input port from the transmission path and outputs the branched light signal to the branching port.

This light branching apparatus corresponds to one which does not have the light insertion function of the abovementioned light branching/inserting apparatus.

Moreover, according to yet another aspect of the present invention, there is provided a light branching/inserting apparatus comprising: a branching/inserting device connected to a transmission path through which wavelength division multiplexed light signals are transmitted, which is capable of branching and inserting light signals having at least one wavelength with respect to light signals on the transmission path; a light branching device for receiving and processing light signals branched by the branching/inserting device for each wavelength; and a light inserting device for outputting insertion light to be inserted into the light signals on the transmission path to the branching/inserting device, wherein the branching/inserting device includes; a wavelength selection filter which can generate at least one surface acoustic wave of a frequency corresponding to a selection signal, and which has an input port to which a light signal received from the transmission path is input, an output port from which a light signal to be output to the transmission path is output, and a branching port connected to the light branching means, and a light wave mixing section for mixing insertion light from the light inserting device into light signals output from the output port and outputting the mixed light signal to the transmission path, and the wavelength selection filter is applied with the selection signal and branches a light signal having a wavelength corresponding to the frequency of the surface acoustic wave contained in the light signal which is sent to the input port from the transmission path and outputs the branched light signal to the branching port, and outputs light signals of other wavelengths to the output port.

Moreover, according to yet another aspect there is provided a light branching/inserting apparatus connected to a transmission path through which wavelength division multiplexed light signals are transmitted, which is capable of branching and inserting light signals having at least one wavelength with respect to light signals on the transmission path, the apparatus comprising: a light branching device for receiving and processing branched light signals for each wavelength; a light inserting device for generating insertion light to be inserted into the light signals on the transmission path, a wavelength selection filter which can generate at least one surface acoustic wave of a frequency corresponding to a selection signal, and which has an input port to which a light signal received from the transmission path is input, an output port from which a light signal to be output to the transmission path is output, and a branching port connected to the light branching device, and a light wave mixing device for mixing insertion light from the light inserting device into light signals output from the output port and outputting the mixed light signal to the transmission path, and the wavelength selection filter is applied with the selection signal and branches a light signal having a wavelength corresponding to the frequency of the surface acoustic wave contained in the light signal which is sent to the input port from the transmission path and outputs the branched light signal to the branching port, and outputs light signals of other wavelengths to the output port.

With such a construction, a wavelength division multiplexed light signal on the transmission path is sent to the input port of the wavelength selection filter. Surface acoustic waves of a frequency matched to the wavelength of the light signal to be branched can be generated in this wavelength selection filter, and only a light signal having a wavelength corresponding to a surface acoustic wave among each light wavelength contained in the light signal sent to the input port is subjected to polarization conversion by means of acousto-optic effects and output from the branching port, and light signals having other wavelengths are output from the output port. The light signal output from the branching port is sent to the light branching device to be received and processed for each wavelength. Moreover, the light signal output from the output port is wave-mixed with insertion light from the light inserting device, in a light wave mixing section and then output to the transmission path.

The abovementioned respective aspect may include at least one optical amplifier which amplifies the light signal up to a power level required for transmission. Thereby the apparatus has a function as a linear repeater. Moreover, the apparatus may comprise a dispersion compensation device for compensating for the dispersion characteristics of the transmission path, and a dispersion compensation light amplifying device for compensating for a loss of the light signal power in the dispersion compensation device. Thereby the influence of the dispersion characteristics of the transmission path on the transmission characteristics of the light signal can be compensated for.

Furthermore, the light branching device may include a light wave dividing section for dividing the light signal output from the branching port of the wavelength selection filter according to the received number of wavelengths, a wavelength selecting section in which the selected wavelength is variable, which is provided for each output port of the light wave dividing section and which selects one light wavelength from the wave-divided light signals and outputs the selected light wavelength, and a reception section for receiving and processing a light wavelength selected by the wavelength selecting section. With this construction, the wavelength of the light signals received and processed by the light branching device can be optionally set, and the number of the light signals can be optionally set within a range of the received number of wavelengths (that is, the number of the wavelength selecting sections and reception sections provided in the light branching device).

Furthermore, the light inserting device may include a light source section for generating light corresponding to all wavelengths which are transmittable on the transmission path; a light wave mixing/dividing section for wave-dividing the wavelength division multiplexed light in which each light wavelength from the light source section is wave-mixed according to the number of inserted wavelengths and outputting the wavelength division multiplexed light; an insertion light generating section in which the selected wavelength is variable, which performs modulation for each wavelength division multiplexed light output from the light wave mixing/dividing section and selects and outputs one light wavelength; a light wave mixing section for mixing a light signal of each wavelength output from the insertion light generating section and outputting the wave-mixed light signals; and a light amplifying section for amplifying a light signal output from the light wave mixing section and outputting the amplified light signal to the insertion port of the wavelength selection filter. In addition, preferably the light inserting device includes a dispersion compensation section for compensating for the dispersion characteristics of the transmission path, and a dispersion compensation light amplifying section for compensating for a loss in the light power in the dispersion compensation section.

With such a construction, the light inserting device can output the insertion light corresponding to all the wavelengths which are transmittable on the transmission path, and can optionally set the wavelength and the number of insertion light signals. Moreover, by outputting insertion light in which the dispersion characteristics of the transmission path has been compensated for, the transmission characteristics of the light signals wave-mixed with the insertion light can be improved.

In addition, the light inserting device described above may include a light source control section for sending only a light wavelength which can be inserted, from the light source section to the light wave mixing/dividing section, or further include an insertion light control section for sending only a light signal of a wavelength to be actually inserted, from the insertion light generating section to the light wave mixing/dividing section. Thus, by providing the light source control section and the insertion light control section, then with respect to the insertion light output from the light inserting device, the leaking in of light wavelengths unnecessary for insertion and the occurrence of cross talk light is prevented.

Furthermore, an apparatus using the abovementioned wavelength selection filter preferably includes a monitoring device for respectively measuring a spectrum of the light signal input from the transmission path to the wavelength selection filter and a spectrum of the light signal output from the wavelength selection filter to the transmission path, to monitor the light power for each wavelength. Moreover, the construction may be such that with the selection signal at least one of the frequency or the output power is adjusted according to the monitoring results of the monitoring device, and with the wavelength selection filter, the light signal power of each wavelength output from the output port is controlled to be almost constant according to the selection signal. In addition, the light inserting device may include a power adjusting section for adjusting the light signal power of each wavelength output from the insertion light generating section according to the monitoring results of the monitoring device.

With such a construction, when there is a difference in the light power of each wavelength of the light signal input/output to/from the wavelength selection filter, a selection signal in which the frequency or the output power is adjusted according to the monitoring results of the monitoring device is sent to the wavelength selection filter, and the power of the insertion light is adjusted by the power adjusting section of the light inserting device. In this way the light signal power of each wavelength output from the output port of the wavelength selection filter is controlled to be almost constant.

Furthermore, the selection signal may have a frequency corresponding to an unused light wavelength which is not contained in the light signal input from the transmission path to the wavelength selection filter. By applying such an RF signal to the wavelength selection filter, noise generated in the unused wavelengths can be removed by the wavelength selection filter.

Moreover, with the abovementioned apparatus preferably the construction includes a temperature control device for controlling a device temperature of the wavelength selection filter to be almost constant, or includes a temperature monitoring device for measuring a device temperature of the wavelength selection filter, and the frequency of the selection signal is corrected based on the measurement results of the temperature monitoring device. As described above, by providing a temperature control device or a temperature monitoring device, the fluctuation in the selected wavelength due to the change of the device temperature in the wavelength selection filter can be suppressed.

BEST MODE FOR CARRYING OUT THE INVENTION

The description of embodiments of the present invention will be made hereinafter based on the appending drawings.

Figure 1:
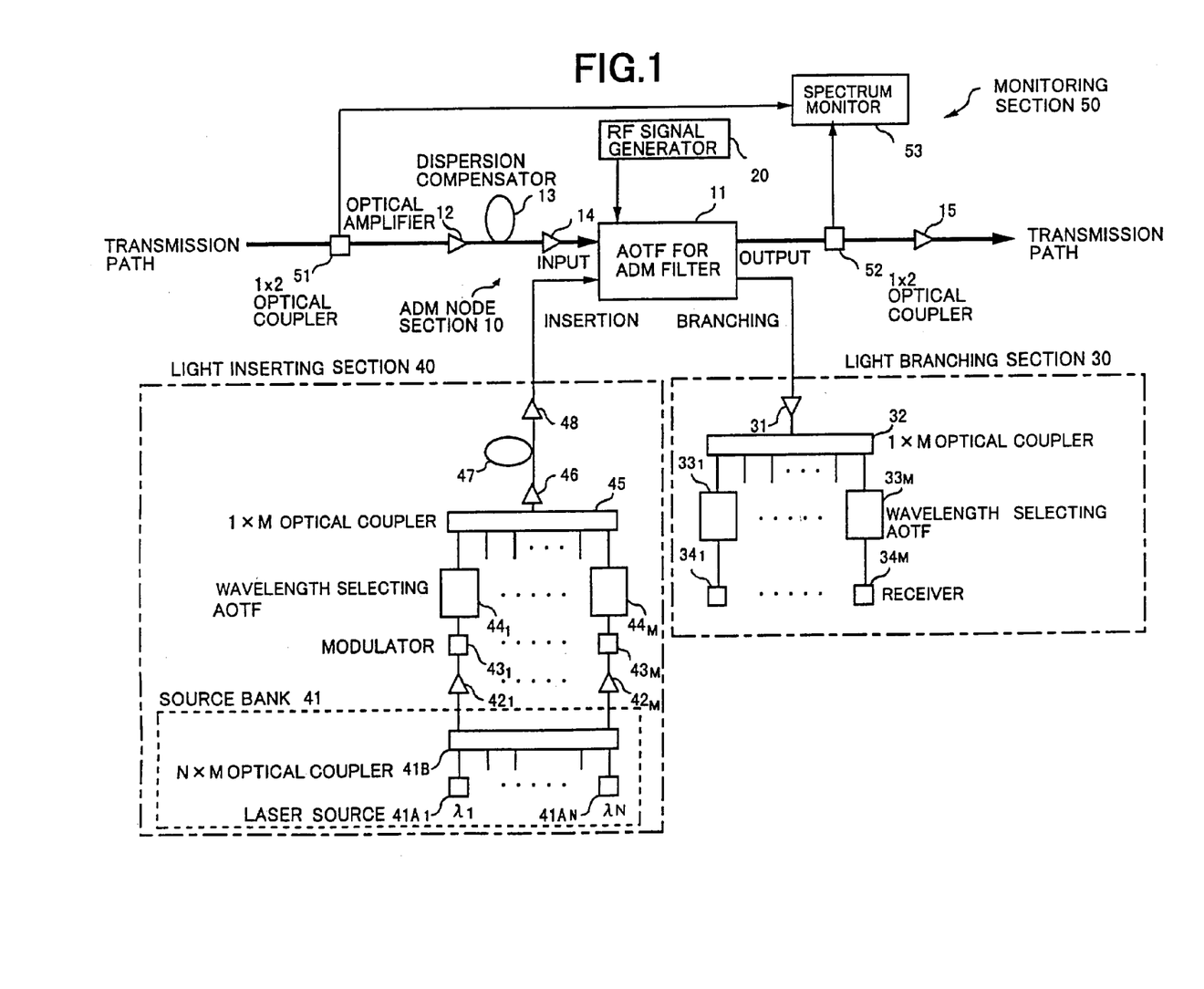
FIG. 1 is a diagram showing a construction of a first embodiment of the present invention.

FIG. 1 shows a construction of a light branching/inserting apparatus (ADM node apparatus) using a wavelength selection filter according to a first embodiment. The explanation will be made for the case where the ADM node apparatus also has a function as a linear repeater.

In FIG. 1, the ADM node apparatus comprises an ADM node section 10, as a branching/inserting device inserted in the transmission path, to which a wavelength division multiplexed light signal is transmitted, an RF signal generator 20 which generates an RF signal which is a selection signal and sends the signal to the ADM node section 10, a light branching section 30 as a light branching device which receives and processes the light signal branched by the ADM node section 10, a light inserting section 40 as a light inserting device which generates light signals inserted into the ADM node section 10, and a monitoring section 50 as a monitoring device which monitors the spectrum of the input light signal from the transmission path to the ADM node section 10 and the output light signal from the ADM node section 10 to the transmission path.

The ADM node section 10 includes a wavelength selection filter 11 utilizing acousto-optic effects, which is used as an ADM filter (Acousto-Optic Tunable Filter; hereinafter referred to as AOTF), optical amplifiers 12, 14, 15 as light amplifying devices, and a dispersion compensator 13 as a dispersion compensating device. The AOTF 11 has four ports for input, output, insertion and branching. To the input port is input a wavelength division multiplexed light signal transmitted on the transmission path via an optical coupler 51 described later, the optical amplifier 12, the dispersion compensator 13 and the optical amplifier 14. The optical amplifier 12 is a wide-band optical amplifier which amplifies a transmitted light signal in the block. The dispersion compensator 13 is a dispersion compensating device for compensating for the influence on the transmission characteristics of the light signal due to the dispersion characteristics of the transmission path, and the optical amplifier 14 is for compensating for a loss of light power in the dispersion compensator 13. The dispersion compensator 13 and optical amplifier 14 are provided at a proper position in the ADM node section 10, according to need, when the dispersion characteristics of the transmission path is large. The light signal output from the output port of the AOTF 11 is sent to the transmission path via an optical coupler 52 described later and the optical amplifier 15. The optical amplifier 15 amplifies the output light signal up to a power suitable for transmission and outputs the amplified light signal to the transmission path. Moreover, the light signal output from the branching port is sent to the light branching section 30 described later, and the light signal output from the light inserting section 40 described later is input to the insertion port.

The AOTF 11 will be explained specifically.

The AOTF 11 is a device effective as a wavelength selection filter, with various kinds of constructions. In general, a surface acoustic wave (SAW) and an optical waveguide are overlapped so that due to their interference, only light of a part of the wavelength in the waveguide is subjected to polarization conversion. This polarized light is then divided by a splitter at a filter projection end so that light having a specific wavelength can be taken out.

Figure 2:
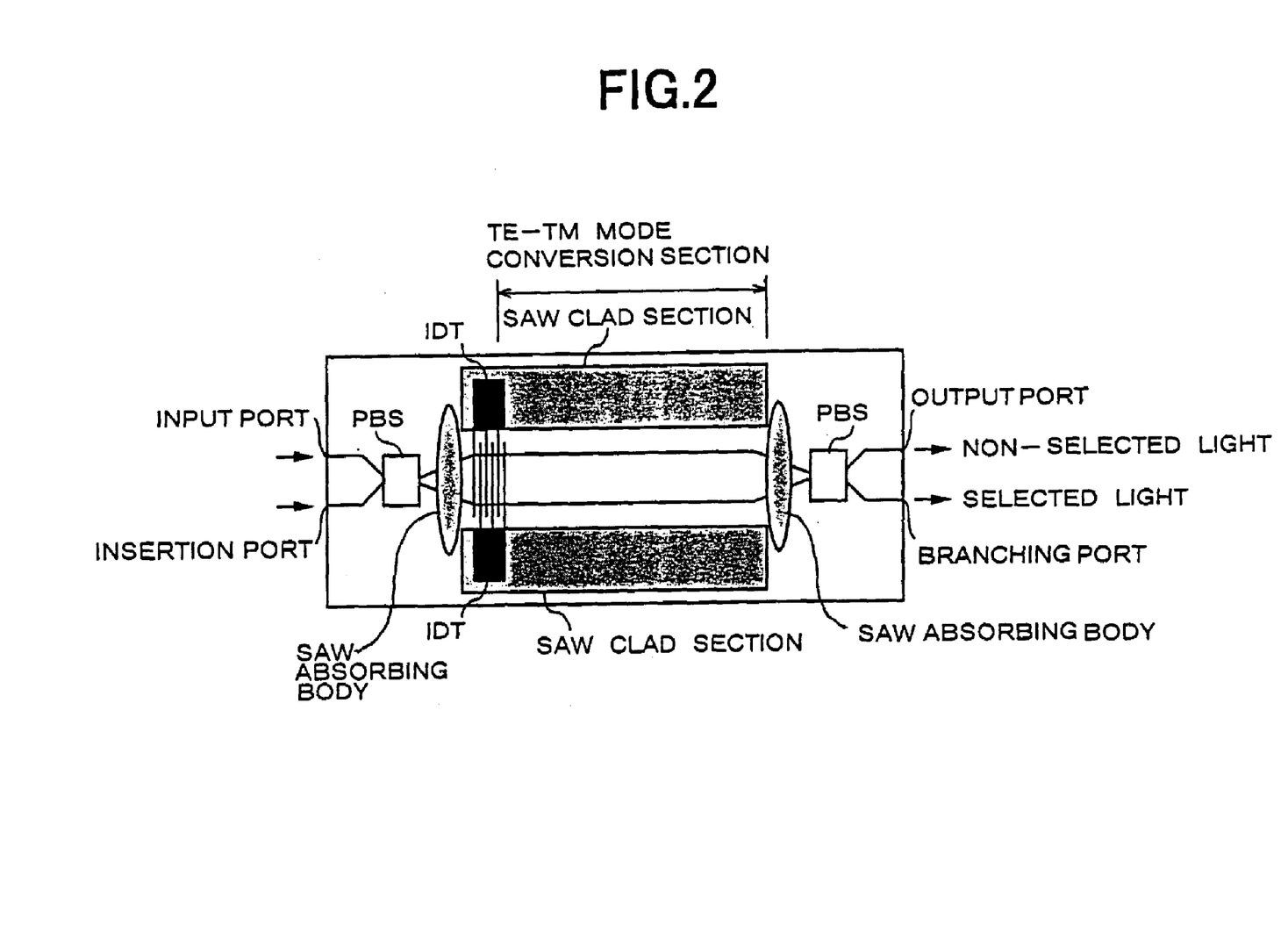
FIG. 2 is a diagram showing a constructional example of an AOTF according to the first embodiment.

FIG. 2 shows one example of the construction of the AOTF 11. With the construction of FIG. 2, by applying an RF signal to an interdigital terminal (IDT), a surface acoustic wave (SAW) is generated and propagated in a SAW clad section. Moreover, a wavelength division multiplexed light signal which has been input to an input port is projected from the input port, polarized and divided by a polarized beam splitter (PBS) on the left side in the figure, and branched into two waveguides. The light signal projected into a TE-TM mode converting section interferes with the SAW, and the polarization state of the light signal of a wavelength corresponding to the frequency of the RF signal is converted. The polarization-converted light signal is polarized and divided by a PBS on the right side in the figure, and output from a branching port for outputting selected light. Light signals of other wavelengths are output from an output port for outputting nonselected light. The frequency of the abovementioned SAW and the wavelength of the selected light have a relationship of 1 to 1 when the temperature of the device is in a certain state. Therefore, if the frequency of the applied RF signal is changed, the wavelength of the selected light changes accordingly. Thereby, an optical filter in which the wavelength is variable can be realized.

Furthermore, when a light signal of a wavelength corresponding to the frequency of the RF signal is inserted from an insertion port at the left-end in the figure, the insertion light is polarization-converted as with the abovementioned selected light and output from the output port. That is to say, the AOTF 11 can branch and insert a light signal of a wavelength corresponding to the frequency of the RF signal at the same time. Moreover, when a plurality of RF signals of different frequencies are mixed and applied to the IDT, light signals of a plurality of wavelengths can be selected corresponding to the frequencies of respective RF signals. Hence, the AOTF 11 is very effective even as an ADM filter which simultaneously selects light signals of not only one wavelength but also a plurality of wavelengths which can be set optionally. Therefore, when such an AOTF 11 is used for the ADM node, light signals of an optional wavelength can be branched or inserted in an optional number, according to the frequency and the number of the applied RF signals.

The RF signal generator 20 generates RF signals of a frequency corresponding to the wavelength of a light signal to be branched or inserted by the AOTF 11, and mixes them to output the RF signals to the AOTF 11.

The light branching section 30 has, for example, an optical amplifier 31, an optical coupler 32 as a light dividing section, wavelength selecting AOTFs $33_1$~$33_M$ as wavelength selecting sections, and receivers $34_1$~$34_M$ as receiving sections. The optical amplifier 31 amplifies the light signal up to a level capable of receiving and processing the power of the branched light output from the branching port of the AOTF 11. The optical coupler 32 branches the light output from the optical amplifier 31 according to the number of light signals (the number of received wavelengths) to be received and processed by this ADM node. Specifically, when all the light signals of each wavelength used for the transmission (for example, λ1~λN) are received and processed by this ADM node, an optical coupler for branching the light output from the optical amplifier 31 into the whole signal number N is required. Moreover, when the maximum branch number M (the maximum number of light signals to be processed by the node, with M<N) is decided, an optical coupler for branching the light output from the optical amplifier 31 into the maximum number M is used. Here, in a system for transmitting light signals having wavelengths of from λ1 to λN, in the case where this is to receive and process at this ADM node light signals having a wavelength of the maximum number M, then 1×M optical couplers for branching the light output from the optical amplifier 31 into M will be used.

The wavelength selecting AOTFs $33_1$~$33_M$ are respectively provided for each output port of the optical coupler 32, in order to select one desired wave among each light wavelength contained in the light signals branched by the optical coupler 32. With each of the wavelength selecting AOTFs $33_1$~$33_M$, the frequency of the RF signal applied thereto (not shown) is controlled and the wavelength of the branched light signals is selected. Incidentally, the wavelength selecting AOTFs $33_1$~$33_M$ used here need not have a function as an ADM filter, as in the AOTF 11 described above. Here, it is important to be able to select an optional wavelength, to have a narrow band property which can sufficiently suppress light signals of other wavelengths, and a side-mode suppressing property, and to include a wavelength tracking function. Moreover, the AOTF is used here as the wavelength selecting section, but other devices which can tune the selected wavelength may be used. The light signals selected by each wavelength selecting AOTF $33_1$~$33_M$ are sent to the respective corresponding receivers $34_1$~$43_M$ to be received and processed therein.

The light inserting section 40 includes, for example, a light source bank 41, optical amplifiers $42_1$~$42_M$, modulators $43_1$~$43_M$, wavelength selecting AOTFs $44_1$~$44_M$, an optical coupler 45 as a light wave mixing section, an optical amplifier 46, a dispersion compensator 47 as a dispersion compensating section, and an optical amplifier 48 as a light amplifying section for dispersion compensation. In order to be able to correspond to the insertion of an optional number of light signals with an optional wavelength, the light inserting section 40 needs a function for optionally selecting light signals of all wavelengths (λ1~λN) to be used in the transmission system and outputting these light signals. For example, when the information to be transmitted is M at most, it is necessary that respective information can be transmitted on light having an optional wavelength. Therefore, the optionally of the wavelength is required for the light sent to the input port of each modulator in the light inserting section 40.

For this purpose, the abovementioned light source bank 41 is a WDM light source having N laser sources $41A_1$~$41A_N$ corresponding to each wavelength λ1~λN to be used, and an N×M optical coupler 41B which mixes the light waves having each wavelength λ1~λN and branches these into the necessary number M of light signals. Here, the light source bank 41 functions as a light source section and a light wave mixing/dividing section. The optical amplifiers $42_1$~$42_M$ are provided for each output port of the optical coupler 41B, and amplify the wavelength division multiplexed light power to the desired level.

Modulators $43_1$~$43_M$ are external modulators for providing the information to be transmitted to the light from the optical amplifiers $42_1$~$42_M$. With the respective modulators $43_1$~$43_M$, one of the M information to be transmitted is carried on all light having the wavelength of λ1~λN. The wavelength selecting AOTFs $44_1$~$44_M$ are wavelength-variable band-pass filters which can select a light signal having an optional wavelength among the light signals containing the wavelength λ1~λN modulated by the modulators $43_1$~$43_M$. Here the modulators $43_1$~$43_M$ and the wavelength selecting AOTFs $44_1$~$44_M$ function as an insertion light generating section. In addition, with regard to each wavelength selecting AOTF $44_1$~$44_M$ to be used here, it is not necessary to include a function as the abovementioned ADM filter as with the AOTFs $33_1$~$33_M$ used in the light branching section 30 as described above, and other devices which can tune the selected wavelength may be used other than the AOTF. Furthermore, the connection position of the wavelength selecting AOTFs $44_1$~$44_M$ is after the modulators $43_1$~$43_M$, but the position is not limited thereto, and for example, they may be arranged between each output port of the light source bank 41 and the respective optical amplifiers $42_1$~$42_M$.

The optical coupler 45 is an M×1 optical coupler for wavelength division multiplexing the light signals selected by the wavelength selecting AOTFs $44_1$~$44_M$ into one light signal and outputting the light signal. The optical amplifier 46 amplifies the output light from the optical coupler 45 to a level which can be inserted into the ADM node section 10. Moreover, the dispersion compensator 47 and the optical amplifier 48 are provided, according to need, in order to compensate for the dispersion characteristics or the like of the transmission path, like the dispersion compensator 13 and the optical amplifier 14 in the abovementioned ADM node section 10.

The monitoring section 50 has optical couplers 51, 52 and a spectrum monitor 53. The optical coupler 51 is provided, for example, before the optical amplifier 12 in the ADM node section 10, and branches a part of the light signals input from the transmission path to the ADM node section 10 and sends the branched light signals to the spectrum monitor 53. Moreover, the optical coupler 52 is provided, for example, after the output port of the AOTF 11, and branches a part of the light signals output from the output port and sends the branched light signals to the spectrum monitor 53. The spectrum monitor 53 measures the spectrum of each light signal branched by the optical couplers 51 and 52, and monitors the light power with respect to the wavelength. This spectrum monitor 53 monitors if the light signal input to the ADM node section 10 is in a normal state or not, and if the operation of the ADM node is normal or not.

The operation of the first embodiment will now be described.

The wavelength division multiplexed light signals transmitted on the transmission path are input to the ADM node apparatus working also as a linear repeater, and then a part of these signals is branched by the optical coupler 51.

The branched light signals are sent to the spectrum monitor 53 and the spectrum thereof is measured. Based on this measurement result, it is monitored whether the light signals reaching the ADM node apparatus through the transmission path contain the normal light wavelength (channel) and whether the power of each light wavelength is at a desired level or not.

When it is judged that the light signals from the transmission path are in a normal state, the light signals through the optical coupler 51 are sent to the dispersion compensator 13 after being sent to the optical amplifier 12 and amplified. Then processing to compensate for the influence of the dispersion characteristics of the transmission path is performed. The dispersion-compensated light signals are amplified by the optical amplifier 14 to compensate for losses in the dispersion compensator 13, and then sent to the input port of the AOTF 11.

The AOTF 11 has applied thereto an RF signal generated by the RF signal generator 20, and by passing light signals sent to the input port through the AOTF 11, then the light signals having a wavelength corresponding to the frequency of the surface acoustic wave are separated from the input light signals and output from the branching port. Simultaneously therewith, insertion light generated by the light inserting section 40 is sent to the insertion port of the AOTF 11, and the insertion light passes through the AOTF 11 to be wave-mixed with the light signals from the input port and output from the output port as the output light. The operation of the light inserting section 40 will be described later.

The wavelength of the insertion light at this time is determined according to the frequency of the RF signal applied to the AOTF 11. Basically, therefore, light signals having the same wavelength as that of the light signals to be branched are inserted. However, it is also possible to branch and insert light signals having a different wavelength. For example, when light signals input to the input port contain light having wavelengths of from λ3 to λN, excluding wavelengths of λ1 and λ2, and when light signals having wavelengths of λ3 and λ4 are branched and light signals having wavelengths of λ1 and λ2 are inserted in this ADM node, RF signals having frequencies corresponding to respective wavelengths of from λ1 to λ4 are applied to the AOTF 11, and only light signals having wavelengths of λ1 and λ2 are sent to the insertion port from the light inserting section 40. In addition, the number of light signals to be branched and the number of light signals to be inserted is not limited to the same number and may be different.

A part of the light signals output from the output port of the AOTF 11 are branched by the optical coupler 52 and sent to the spectrum monitor 53. With the spectrum monitor 53, the spectrum of the branched light is measured, and it is judged whether the branching, insertion or transmission of the light signals in this ADM node has been performed normally or not. If judged to be normal, the light output from the output port is sent to the optical amplifier 15 through the optical coupler 52, amplified to the level optimal for transmission and transmitted to the transmission path.

The light signals output from the branching port of the AOTF 11 are sent to the optical amplifier 31 in the light branching section 30 and amplified to the desired power. The amplified light to be branched is sent to the optical coupler 32 and branched into M light signals. Since each light signal branched into M contains each light wavelength selected by the ADM node section 10, the light signals are sent to the wavelength selecting AOTFs $33_1$~$33_M$, to select a light signal having one wavelength among them. With each wavelength selecting AOTF $33_1$~$33_M$, the frequency of an RF signal applied thereto (but not shown) is adjusted according to the receiving wavelength of the corresponding receivers $34_1$~$34_M$, so that only light signals having wavelengths which agree with the received wavelengths of the receivers $34_1$~$34_M$ are output from the branching port. Light signals of each wavelength selected as described above are received and processed by respective receivers $34_1$~$34_M$.

With the light inserting section 40, light having wavelengths of λ1~λN is projected from respective laser sources $41A_1$~$41A_N$ in the light source bank 41. Each light wavelength is wavelength division multiplexed by the optical coupler 41B, branched into M light signals and output from the light source bank 41. Each wavelength division multiplexed light signal is amplified by the optical amplifiers $42_1$~$42_M$, respectively, and sent to the modulators $43_1$~$43_M$, and light of each wavelength of λ1~λN is modulated in the block in each modulator $43_1$~$43_M$. The light signals modulated by respective modulators $43_1$~$43_M$ are sent to the wavelength selecting AOTFs $44_1$~$44_M$, respectively, so that only a specific wavelength component is selected among wavelengths of λ1~λN. Since the frequency of the RF signal to be applied has been adjusted according to the wavelength of the light signal to be transmitted, each wavelength selecting AOTF $44_1$~$44_M$ outputs from the branching port only a light signal having a wavelength corresponding to the RF signal. The light signals output from the branching port of each wavelength selecting AOTF $44_1$~$44_M$ are sent to the optical coupler 45 and wave-mixed to one light signal. The light output from the optical coupler 45 is amplified by the optical amplifier 46, subjected to processing for compensating for the dispersion characteristics or the like of the transmission path by means of the dispersion compensator 47 and the optical amplifier 48, and sent to the insertion port of the AOTF 11.

According to the first embodiment, by using the AOTF 11 as the ADM filter, it is not necessary to separate light signals having all the wavelengths contained in the wavelength division multiplexed light signals from the transmission path, as in the conventional ADM node apparatus using the AWG, and only a light signal having a wavelength in which branching or insertion is necessary in the ADM node can be wave-divided or wave-mixed. Hence, there can be provided an ADM node apparatus having a simple structure and a small size which does not use a number of optical fibers or optical devices. Furthermore, with this ADM node apparatus, by setting the frequency of the RF signal and the number of signals applied to the AOTF 11 properly, it is possible to branch, insert or transmit an optional number of light signals with an optional wavelength. Moreover, by providing the dispersion compensators 13 and 47 for compensating for the influence of the dispersion characteristics of the transmission path, and optical amplifiers 14 and 48 for compensating for a loss in the dispersion compensators 13 and 47, a light transmission system with excellent transmission properties can be realized.

A second embodiment will now be described.

Figure 3:
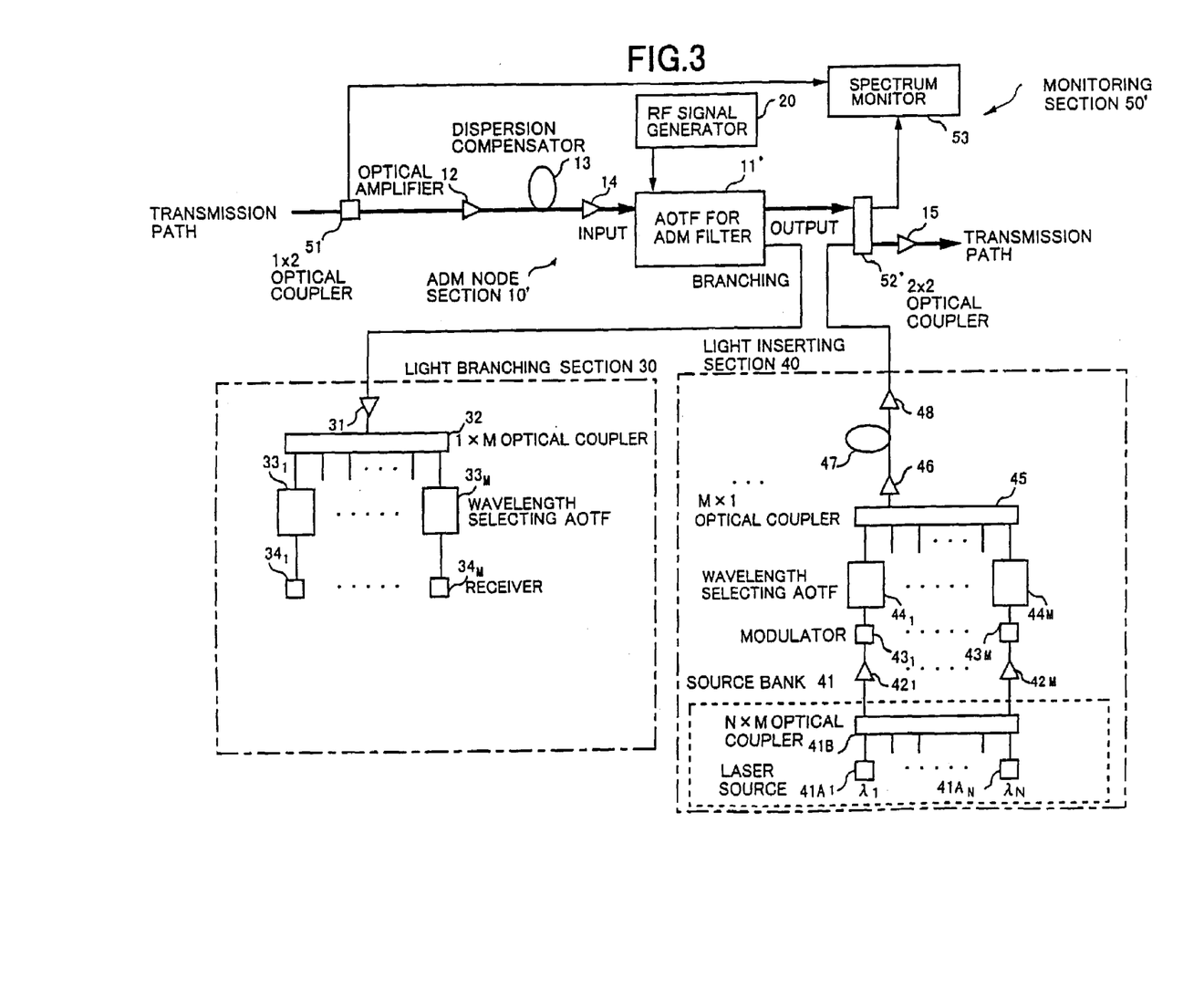
FIG. 3 is a diagram showing a construction of a second embodiment of the present invention.

With the second embodiment, a description will be given for a construction in which an optical coupler is provided after the output port of the AOTF, and the output light and the insertion light are wave-mixed by this optical coupler, instead of having the light signals inserted from the insertion port of the AOTF 11 as in the first embodiment.

FIG. 3 shows a construction of the ADM node apparatus of the second embodiment.

In FIG. 3, a different point in the construction of the ADM node apparatus from the construction of the first embodiment is that an AOTF 11' having three ports of input, output and branching is used instead of the AOTF 11 having four ports, and that instead of the 1×2 optical coupler 52 which branches a part of the light output from the AOTF 11, a 2×2 optical coupler 52' is used as the light wave mixing section, to wave-mix the light output from the AOTF 11' and the light inserted from the light inserting section 40, and send the wave-mixed light to the transmission path. The other parts in the construction and the operation thereof are the same as in the construction of the first embodiment and the operation thereof. Therefore, explanation thereof will be omitted.

The wavelength division multiplexed light signals are input to the input port of the AOTF 11' from the transmission path through the optical coupler 51, the optical amplifier 12, the dispersion compensator 13 and the optical amplifier 14. To this AOTF 11' has been applied an RF signal generated from the RF signal generator 20, as in the first embodiment, and only a light wavelength corresponding to the frequency of the RF signal is polarization-converted, and output from the branching port, and other light wavelengths are output from the output port. However, with the AOTF 11', since there is no insertion of a light signal, in contrast to the first embodiment, the applied RF signal becomes a signal of a frequency corresponding to the wavelength of the branched light signal.

Here, it is assumed that, among the wavelengths of λ1~λN used in the system, then with respect to the light wavelength which is not contained in the light signals input to the input port of the AOTF 11', the RF signal of a frequency corresponding to this wavelength is also applied to the AOTF 11'. By applying such an RF signal, noise generated in an unused wavelength can be branched and removed by the AOTF 11'. In this way, when a light signal having an unused wavelength is wave-mixed by the optical coupler 52' with the light output by the AOTF 11', the influence of noise can be prevented.

The light to be output from the output port of the AOTF 11' is input to one of the input ports in the optical coupler 52', and the insertion light output from the light inserting section 40 is input to the other input port therein. The inputted output light and the insertion light are mixed and then branched into two, and one of the light signals is sent to the transmission path via the optical amplifier 15. Moreover, the other light signal is sent to the spectrum monitor 53 and the spectrum thereof is measured.

As described above, even with the second embodiment, there can be provided an ADM node apparatus with excellent transmission properties, capable of branching, inserting or transmitting an optional number of light signals with an optional wavelength, giving a similar effect to the first embodiment. Furthermore, with the second embodiment, the construction of the AOTF 11' for the ADM filter is a three-port structure, that is, one port input and two ports output, with the effect that the apparatus construction becomes simple compared to the case using the AOTF 11 having a four-port structure. Furthermore, by applying the RF signal of a frequency corresponding to a light wavelength which is not contained in the input light signals to the AOTF 11', the influence of noise is reduced, and hence the transmission characteristics are further improved.

A third embodiment will now be described.

Figure 4:
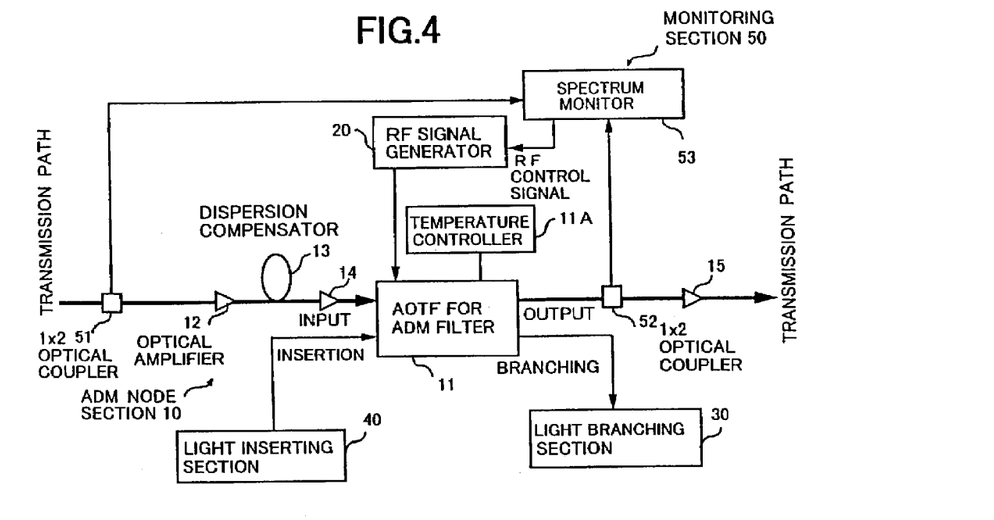
FIG. 4 is a diagram showing a construction of a third embodiment of the present invention.

With the third embodiment, a description will be given for the case where a function to control the power of the light signals in the ADM node and to prevent a fluctuation in the selected wavelength due to temperature change of the AOTF is included.

FIG. 4 shows an example of a construction of the ADM node apparatus according to the third embodiment. This construction adds the abovementioned function to the ADM node apparatus (FIG. 1) according to the first embodiment. Parts with the same construction as shown in FIG. 1 are denoted by the same symbols and explanation thereof will be omitted.

In FIG. 4, the points in the construction of this ADM node apparatus different from the construction of the first embodiment are that the RF control signal based on the measurement results of the spectrum monitor 53 is sent to the RF signal generator 20 from the spectrum monitor 53, and that a temperature controller 11A is provided as a temperature control device for controlling the temperature of the AOTF 11 to be constant. Other parts are the same as the construction of the first embodiment.

In general, with light transmission using the WDM method, it is necessary that the light signal power of each wavelength is transmitted at an almost constant level. Therefore, with this ADM node apparatus, the spectrum of the light signals from respective optical couplers 51 and 52 is measured by the spectrum monitor 53 to judge whether the light signal power of each wavelength is at an almost constant level or not. When there is a difference in the light signal power of each wavelength, the spectrum monitor 53 generates an RF control signal for correcting the difference, and sends the RF control signal to the RF signal generator 20. The RF signal generator 20 adjusts the frequency or the output power (amplitude) of the RF signal applied to the AOTF 11, according to the RF control signal. Specifically, for example, if the light signal power of a wavelength of l1 is larger than that of the other wavelengths, the RF signal generator 20 generates an RF signal of a frequency corresponding to the wavelength of $\lambda 1$ with an output power corresponding to the power difference with each light signal, and applies the RF signal to the AOTF 11. Hence, with the AOTF 11, the light signal of the wavelength of $\lambda 1$ is branched according to the output power of the RF signal, and the light signal power of the wavelength of l1 contained in the output light is adjusted. Thus the light signal power of each wavelength is controlled to an almost constant value.

As described above, the selected wavelength in the AOTF is decided only by the applied RF frequency and the device temperature. However, the temperature changes significantly depending upon the environment where the AOTF is used, and even if the same RF signal is applied, reproducibility of the selected wavelength may not be ensured. For example, it has been reported that the temperature dependency of the selected wavelength is about 0.76 nm/° C. In order to eliminate the influence of the temperature dependency, a temperature controller 11A is provided here. This temperature controller 11A is for controlling the temperature of the AOTF 11 to be almost constant, irrespective of the change of the environment. In addition, though not shown, a similar temperature controller is provided for each wavelength selecting AOTF $33_1 \sim 33_M$ and $44_1 \sim 44_M$ respectively arranged in the light branching section 30 and the light inserting section 40.

As described above, according to the third embodiment, by adjusting the frequency of the RF signal applied to the AOTF 11 or the output power, based on the measurement results of the spectrum monitor 53, the light signal power of each wavelength to be sent from this ADM node apparatus to the transmission path can be controlled to an almost constant value. Hence, stable light transmission using the WDM method becomes possible. Moreover, by controlling the temperature of the AOTF to be almost constant, wavelength control of the wavelength division multiplexed light signal can be performed more accurately.

A fourth embodiment will now be described.

Figure 5:
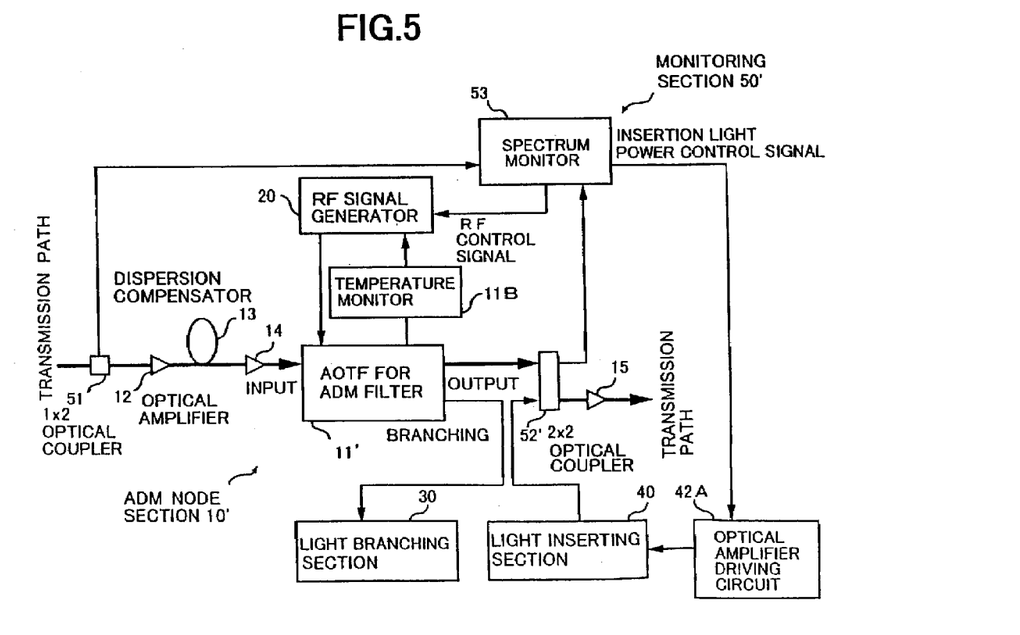
FIG. 5 is a diagram showing a construction of a fourth embodiment of the present invention.

With the fourth embodiment, a description will be given for the case where a function similar to that of the abovementioned third embodiment is added to the ADM node apparatus of the second embodiment (FIG. 3).

FIG. 5 shows the construction of the ADM node apparatus of the fourth embodiment. Parts with the same construction as shown in FIG. 3 are denoted by the same symbols and explanation thereof will be omitted.

In FIG. 5, with this ADM node apparatus, the RF control signal is sent to the RF signal generator 20 based on the measurement results of the spectrum monitor 53, while an insertion light power control signal is sent to an optical amplifier driving circuit 42A as a power adjusting section for controlling the light amplifying operation of each optical amplifier $42_1 \sim 42_M$ of the light inserting section 40. Moreover, a temperature monitor 11B is provided in the AOTF 11' as a temperature monitoring device for measuring the temperature of the AOTF 11, and the measured temperature information is sent to the RF signal generator 20. In addition, though not shown, a temperature monitor is also provided for each wavelength selecting AOTF $33_1 \sim 33_M$ and $44_1 \sim 44_M$ respectively arranged in the light branching section 30 and the light inserting section 40. The construction of the fourth embodiment other than as mentioned above is the same with that of the second embodiment.

With the spectrum monitor 53, the spectrum of the light signal from each optical coupler 51 and 52' is measured, and it is judged whether the light signal power of each wavelength is almost constant or not. If there is a difference between light signal power of each wavelength, the RF control signal and the insertion light power control signal for correcting the difference are sent to the RF signal generator 20 and the optical amplifier driving circuit 42A. To the RF signal generator 20 is sent the information indicating the temperature of the AOTF 11' from the temperature monitor 11B, in addition to the RF control signal from the spectrum monitor 53.

The RF signal generator 20 corrects the relation between the selected wavelength of the AOTF 11' and the frequency of the RF signal based on the temperature information of the AOTF 11', adjusts the frequency of the RF signal or the output power according to the RF control signal and applies the RF signal to the AOTF 11', as in the abovementioned third embodiment. In this way, the output light power of the AOTF 11 is controlled. Furthermore, the optical amplifier driving circuit 42A adjusts the light amplifying operation of each optical amplifier $42_1 \sim 42_M$ according to the insertion light power control signal, and controls the power of each light wavelength output from the light inserting section 40. Then, the output light from the AOTF 11' and the insertion light from the light inserting section 40 in which the power of each light wavelength is controlled are wave-mixed in the optical coupler 52', and a light signal in which each light wavelength power is controlled to an almost constant value is transmitted to the transmission path.

As described above, even with the fourth embodiment, the light signal power of each wavelength to be transmitted to the transmission path is controlled to an almost constant value, as in the third embodiment. Hence stable light transmission in the WDM method is possible. Moreover, by monitoring the device temperature of the AOTF to correct the frequency of the RF signal, the wavelength control of the division multiplexed light signal can be performed more accurately.

In addition, with the abovementioned third and fourth embodiments, by controlling the RF signal applied to the AOTFs 11, 11' and the light amplifying operation of the optical amplifiers $42_1 \sim 42_M$ in the light inserting section 40, the difference in the light signal power of each wavelength is adjusted. Construction, other than this, for example, in which the operation condition of the optical amplifier 15 on the output side in the ADM node section 10 is controlled can also be considered. In this case, if the number of light wavelengths to be amplified by the optical amplifier 15 is changed, the operating characteristics of the optical amplifier 15 may be changed. However, if the relation between the number of light wavelengths and the operating characteristics of the optical amplifier 15 is known in advance, the fluctuation in the operating characteristics of the optical amplifier 15 with the fluctuation of the number of light wavelengths can be corrected. For example, the information regarding the number of light wavelengths can be transferred to the optical amplifier 15, and based on this information, the rising power of the optical amplifier 15 can be controlled.

Furthermore, in the third embodiment, a temperature controller is provided, while in the fourth embodiment, a temperature monitor is provided. However, the temperature monitor may of course be provided in the third embodiment, and the temperature controller provided in the fourth embodiment.

A fifth embodiment will now be described.

Figure 6:
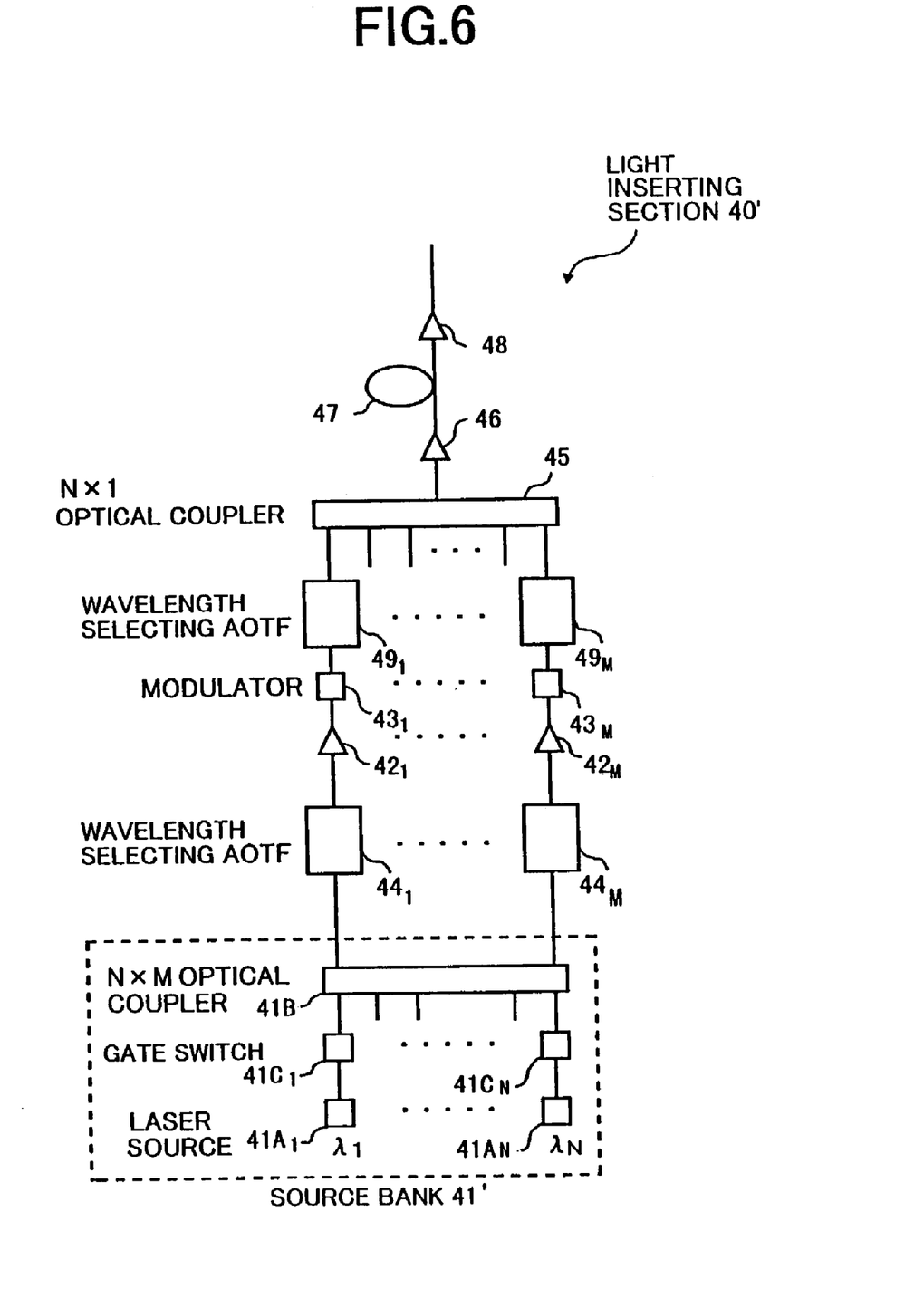
FIG. 6 is a diagram showing a construction of a light inserting section according to a fifth embodiment of the present invention.

With the fifth embodiment, a description will be given for the case where a function for inhibiting the occurrence of coherent cross talk in the light inserting section 40 in the abovementioned respective embodiments is provided.

FIG. 6 shows a construction example of the light inserting section according to this embodiment. Parts with the same construction as with the light inserting section 40 in the abovementioned respective embodiments are denoted by the same symbols and explanation thereof will be omitted.

In FIG. 6, in the light inserting section 40' of this ADM node apparatus, a light source bank 41' is used in which gate switches 41C$_1$~41C$_N$ are respectively arranged as a light source control section between each laser source 41A$_1$~41A$_N$ and an N×M optical coupler 41B. Each wavelength division multiplexed light signal output from this light source bank 41' is respectively sent to the wavelength selecting AOTFs 44$_1$~44$_M$. With each wavelength selecting AOTF 44$_1$~44$_M$, one light wavelength which provides the transmission information is selected by each of the subsequent modulators 43$_1$~43$_M$. The selected respective light wavelengths are amplified by the corresponding optical amplifiers 42$_1$~42$_M$ and modulated by the modulators 43$_1$~43$_M$. After each modulator 43$_1$~43$_M$, is provided for example wavelength selecting AOTFs 49$_1$~49$_M$. Each wavelength selecting AOTF 49$_1$~49$_M$ is provided for removing the leaked-in light signals contained in the light signals output from each modulator 43$_1$~43$_M$. Here, the wavelength selecting AOTFs 49$_1$~49$_M$ function as insertion light control sections.

In order to specifically explain the operation of the abovementioned light inserting section 40', for example a case is considered where light signals having wavelengths of λ1 and λ2 are output as the insertion light. In this case, each laser source 41A$_1$~41A$_N$ of the light source bank 41' generates light having wavelengths of from λ1 to λN, respectively. However, in order to avoid the occurrence of unnecessary cross talk light and to alleviate the suppressed level of the AOTFs, light having wavelengths of from λ3 to λN are intercepted by gate switches 41C$_1$~41C$_N$, and only the light having wavelengths of λ1 and λ2 pass through the gate switches 41C$_1$ and 41C$_2$. The light having wavelengths of λ1 and λ2 are wavelength division multiplexed by the optical coupler 41B, branched into M, and output from each output port.

Then, the output light from the light source bank 41' is sent to the wavelength selecting AOTFs 44$_1$~44$_M$, and in this case, the light having a wavelength of λ1 is selected by the wavelength selecting AOTF 44$_1$, and the light having a wavelength of λ2 is selected by the wavelength selecting AOTF 44$_2$. At this time, when the characteristics of the wavelength selecting AOTF 44$_1$ (44$_2$) do not have a suppressing degree for suppressing the other wavelength so as to sufficiently suppress the coherent cross talk, light having a wavelength of λ2 (λ1) is selected as the leaked-in light as well as the light having a wavelength of λ1 (λ2).

The selected light from each wavelength selecting AOTF 44$_1$, 44$_2$ is amplified and modulated by optical amplifiers 42$_1$, 42$_2$ and modulators 43$_1$, 43$_2$, respectively. Here, if the output light from each modulator 43$_1$, 43$_2$ is directly wave-mixed by the optical coupler 45, coherent cross talk will be caused due to the abovementioned leaked-in light. To prevent this, then here after each modulator 43$_1$, 43$_2$ is further provided wavelength selecting AOTFs 49$_1$ and 49$_2$ to reduce the leaked-in light. Moreover, by passing through the wavelength selecting AOTFs 49$_1$ and 49$_2$, noise or the like of accumulated spontaneous emission (ASE) generated in the optical amplifiers 42$_1$, 42$_2$ can be eliminated. The output light signals from each wavelength selecting AOTF 49$_1$, 49$_2$ are wave-mixed by the optical coupler 45, amplified by the optical amplifier 46, and then subjected to processing such as dispersion compensation and the like by the dispersion compensator 47 and the optical amplifier 48, and sent to the optical coupler 52' as the insertion light.

Thus, according to the fifth embodiment, by the light inserting section 40' having a construction for suppressing the cross talk light, the occurrence of the coherent cross talk is reduced. Hence deterioration of the transmission characteristics of the light signal can be prevented.

In addition, in the fifth embodiment described above, gate switches 41C$_1$~41C$_N$ are provided to intercept unnecessary light wavelengths. However the construction is not limited to this, and may be such that the drive current of each laser source 41A$_1$~41A$_N$ is directly controlled to intercept unnecessary light wavelengths.

Figure 7:
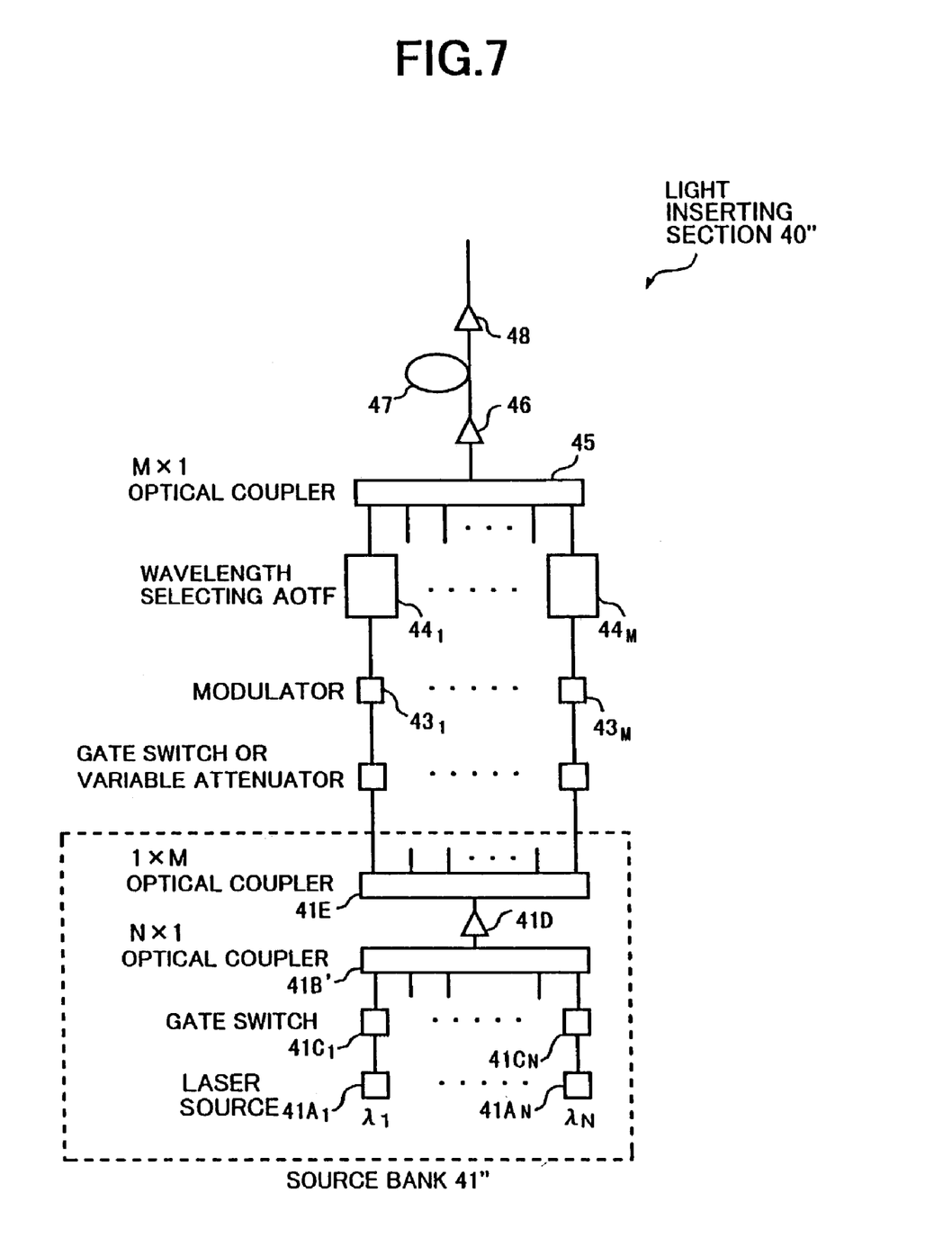
FIG. 7 is a diagram showing other constructional example of the light inserting section of the present invention.

Furthermore, if the wavelength selecting AOTFs 44$_1$~44$_M$ can suppress light having other wavelengths to a certain level or below, then instead of having wavelength selecting AOTFs in two stages, for example, as shown in the light inserting section 40" of FIG. 7, gate switches, variable attenuators or the like may be provided before each modulator 43$_1$~43$_M$ to intercept light signals of unnecessary wavelength, thereby preventing the occurrence of coherent cross talk. In FIG. 7, there is shown a case where the wavelength selecting AOTFs 44$_1$~44$_M$ are arranged after each modulator 43$_1$~43$_M$. However the wavelength selecting AOTFs 441~44$_M$ may be arranged before or after each modulator 43$_1$~43$_M$.

Furthermore, the light source bank 41' is not limited to the construction shown in FIG. 6, and for example, it may have such a construction that light from each laser source 41A$_1$~41A$_N$ via gate switches 41C$_1$~41C$_N$ is wave-mixed by the N×1 optical coupler 41B', and amplified by the optical amplifier 41D, and branched into M by the 1×M optical coupler 41E. In this case, each optical amplifier 42$_1$~42$_M$ provided before each modulator 43$_1$~43$_M$ may be omitted.

As described above, the present invention uses a wavelength selection filter which utilizes acousto-optic effects and has four ports. Hence there is no need to separate the light signals of all the wavelengths contained in the wavelength division multiplexed light signals from the transmission path as in the conventional light branching/inserting apparatus using an AWG or the like, and only those light signals having the necessary wavelength can be branched or inserted with the wavelength selection filter. Hence, a light branching/inserting apparatus with a simple construction can be realized in a reduced size. Furthermore, if a wavelength selection filter having three ports is used instead of the AOTF with four ports, and the insertion light is wave-mixed by a subsequent light wave-mixing section, a similar effect can be obtained even if a wavelength selection filter having a simpler construction is used.

Furthermore, by providing a light amplifying device, the light branching/inserting apparatus functions as a linear repeater, and by providing a dispersion compensating device and a light amplifying device for dispersion compensation, the dispersion characteristics of the transmission path can be compensated for. Therefore, an optical network with excellent transmission properties can be constructed by using this apparatus.

Moreover, by constituting the light branching device and the light inserting device such that the wavelength of the light signals to be processed and the number thereof can be optionally set, then they can easily be made to correspond to the change of the wavelength to be used, the increase in the number of signals, or the like. Moreover, by providing the dispersion compensating section and the light amplifying section for dispersion compensation also in the light inserting device, the transmission characteristics of the light signals mixed with the insertion light becomes even better.

In addition, by providing a light source control section and an insertion light control section in the light inserting device, leaked-in light wavelengths which are unnecessary for the insertion, and the occurrence of coherent cross talk can be prevented. Hence, an optical network having even better transmission characteristics can be constituted.

Furthermore, by providing a monitoring device, it becomes possible to monitor the light signals input/output to/from this apparatus. Moreover, by adjusting the frequency of the selected signals sent to the wavelength selection filter and by adjusting the power of the insertion light with the power adjusting section of the light inserting device based on the monitor results of the monitoring device, the light signal power of each wavelength sent from this apparatus to the transmission path is controlled to an almost constant value. Hence stable light transmission using the WDM method becomes possible.

In addition, by applying the selected signal of the frequency corresponding to unused light wavelengths to the wavelength selection filter, noise or the like generated in the unused wavelengths can be removed by the wavelength selection filter. Hence, the transmission characteristics can be further improved.

Furthermore, by providing a temperature control device and a temperature monitoring device, the influence of the change in the device temperature of the wavelength selection filter can be reduced. Hence, the wavelength of the wavelength division multiplexed light signals can be controlled more accurately.

The invention claimed is:

1. An apparatus comprising:
    a wavelength selection filter including first, second, third and fourth ports, the first port receiving a wavelength division multiplexed (WDM) light including a plurality of lights at different wavelengths multiplexed together, the second port receiving an insertion light, and, in accordance with a surface acoustic wave generated in the wavelength selection filter via a selection signal applied to the wavelength selection filter, the wavelength selection filter branches a respective light from the received WDM light at a wavelength corresponding to a frequency of the surface acoustic wave, outputs the branched light from the third port and outputs the insertion light and the WDM light having said respective light branched therefrom from the fourth port; and
    an optical coupler, arranged in front of the first port, branching a portion of the WDM light; and
    a spectrum monitor monitoring a spectrum of the branched portion and a spectrum of light output from the fourth port, and monitoring whether the wavelength selection filter is operating properly in accordance with the monitored spectrums.

2. An apparatus as in claim 1, wherein the wavelength selection filter is an acoustic-optic tunable filter (AOTF).

3. An apparatus as in claim 1, wherein the insertion light is at the same wavelength as said respective light branched from the WDM light.

4. An apparatus as in claim 2, wherein the insertion light is at the same wavelength as said respective light branched from the WDM light.

5. An apparatus as in claim 1, wherein the WDM light is received by the first port from a transmission path, and light output from the fourth port is output to the transmission path.

6. An apparatus as in claim 2, wherein the WDM light is received by the first port from a transmission path, and light output from the fourth port is output to the transmission path.

7. An apparatus as in claim 1, further comprising:
    a dispersion compensator, arranged between the optical coupler and the first port of the wavelength selection filter, compensating for dispersion in the WDM light.

8. An apparatus comprising:
    an acoustic-optic tunable filter (AOTF) including first, second, third and fourth ports, the first port receiving a wavelength division multiplexed (WDM) light including a plurality of lights at different wavelengths multiplexed together, the second port receiving an insertion light, and, in accordance with a selection signal applied to the AOTF, the AOTF branches a respective light from the received WDM light, outputs the branched light from the third port and outputs the insertion light and the WDM light having said respective light branched therefrom from the fourth port; and
    an optical coupler, arranged in front of the first port, branching a portion of the WDM light; and
    a spectrum monitor monitoring a spectrum of the branched portion and a spectrum of light output from the fourth port, and monitoring whether the AOTF is operating properly in accordance with the monitored spectrums.

9. An apparatus as in claim 8, further comprising:
    a dispersion compensator, arranged between the optical coupler and the first port of the AOTF, compensating for dispersion in the WDM light.

10. An apparatus as in claim 9,
    wherein the spectrum monitor also monitors a spectrum of light output from the fourth port, and monitors whether the AOTF is operating properly in accordance with the monitored spectrums.

11. An apparatus as in claim 8, wherein the spectrum monitor monitors whether the AOTF properly outputs the branched light from the third port and properly outputs the insertion light and the WDM light having said respective light branched therefrom from the fourth port, in accordance with the monitored spectrum, to thereby monitor whether the AOTF is operating properly.

12. An apparatus comprising:
    a section which has an AOTF with four ports as a wavelength selection filter and is connected to a transmission path, an RF signal generator which generates an RF signal of an optional frequency and applies the signal to the AOTF, and a light inserting section which generates an optional number of insertion light signals with optional wavelengths and sends the insertion light signals to an insertion port of the AOTF, a first port of the four ports being a port for receiving a wavelength division multiplexed (WDM) light into the AOTF for wavelength selection by the AOTF, the insertion port being a port of said four ports and being a different port than the first port;
    an optical coupler, arranged in front of the first port, branching a portion of the WDM light; and
    a spectrum monitor monitoring a spectrum of the branched portion and a spectrum of light output from the fourth port, and monitoring whether the AOTF is operating properly in accordance with the monitored spectrums.

13. An apparatus as in claim 12, further comprising a selected wavelength-variable light branching section which receives and processes a light signal output from a branching port of the AOTF for each wavelength, the branching port being a port of said four ports, and being a different port than the first port and the insertion port.

14. An apparatus as in claim 12, further comprising:
a dispersion compensator, arranged between the optical coupler and the first port of the AOTF, compensating for dispersion in the WDM light.

15. An apparatus comprising:
an acoustic-optic tunable filter (AOTF) including first, second, third and fourth ports, the first port receiving a wavelength division multiplexed (WDM) light including a plurality of lights at different wavelengths multiplexed together, the second port receiving an insertion light, and, in accordance with a selection signal applied to the AOTF, the AOTF branches a respective light from the received WDM light, outputs the branched light from the third port and outputs the insertion light and the WDM light having said respective light branched therefrom from the fourth port;
an optical coupler, arranged in front of the first port, branching a portion of the WDM light; and
a spectrum monitor monitoring a spectrum of the WDM light from the branched portion, and monitoring whether the AOTF properly outputs the branched light from the third port and properly outputs the insertion light and the WDM light having said respective light branched therefrom from the fourth port in accordance with the monitored spectrum.

16. An apparatus comprising:
an acoustic-optic tunable filter (AOTF) including first, second, third and fourth ports, the first port receiving a wavelength division multiplexed (WDM) light including a plurality of lights at different wavelengths multiplexed together, the second port receiving an insertion light, and, in accordance with a selection signal applied to the AOTF, the AOTF branches a respective light from the received WDM light, outputs the branched light from the third port and outputs the insertion light and the WDM light having said respective light branched therefrom from the fourth port;
an optical coupler, arranged in front of the first port, branching a portion of the WDM light; and
means for monitoring a spectrum of the WDM light from the branched portion and for monitoring whether the AOTF properly outputs the branched light from the third port and properly outputs the insertion light and the WDM light having said respective light branched therefrom from the fourth port in accordance with the monitored spectrum.

* * * * *